United States Patent Office 2,696,124
Patented Dec. 7, 1954

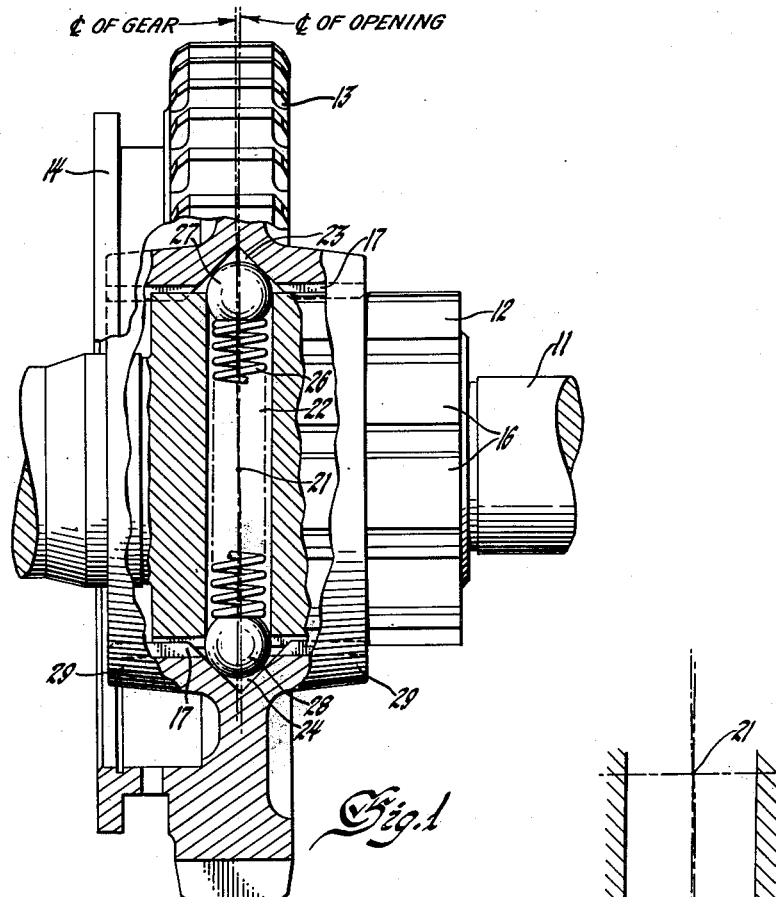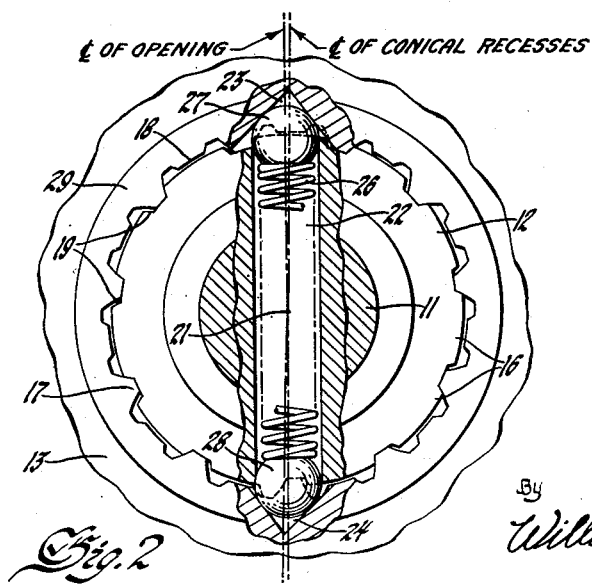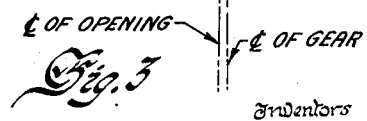

2,696,124

TRANSMISSION ANTIRATTLE GEARING

William H. Flowers, Detroit, and Robert S. Plexico, Royal Oak, Mich., assignors to General Motors Corporation, Detroit, Mich., a corporation of Delaware Application April 22, 1952, Serial No. 283,608

7 Claims. (Cl. 74—325)

The present invention relates to a slide gear transmission mechanism of the type having a gear member splined upon a shaft and movable axially between power transmitting and non-power transmitting positions. More particularly the invention relates to a mechanism for preventing relative movement between the gear and the shaft when in the non-power transmitting position.

In a sliding gear transmission, a shiftable gear member is normally splined upon a shaft and is adapted to be shifted to a position in which it transmits power or may be moved to a position where it merely floats upon the shaft without transmitting power. In the floating condition it is common for such gears to rattle upon the shaft and create objectionable noises. It is the purpose of the subject invention to eliminate the source of such noise.

To insure that the gear is freely slidable upon its shaft, radial and pitch circle clearances are provided between the coacting splines on the gear and shaft. These clearances while very small nevertheless permit the periodic striking together of the gear and shaft splines resulting in transmission noise.

The rattling or relative movement of the gear upon the shaft is generally the resultant of uncontrolled oscillation of the gear. The oscillation of the gear is mainly the result of two motion components which, if they are individually eliminated, will substantially prevent gear oscillation. The first motion is a rocking action in the plane of rotation of the gear as a result of the tendency of a free floating gear to overrun and underrun its shaft and which motion is commonly referred to as torsional backlash. The second component motion of the gear occurs in a plane through the shaft axis and normal to the plane of rotation of the gear as the result of fore and aft rocking of the gear upon the shaft. The first type of gear motion is caused mainly by the pulsating power inherently delivered by an internal combustion engine coupled with the varying reaction torque created in the power transmission system by the traction members. The second type of gear motion may be caused, for instance, by intermittent inclination of the shaft relative to its normal lay. Either of these types of movements may, of course, be accentuated by mass imbalances created in the formation or mounting of the gear.

Numerous efforts have been made to eliminate the objectionable noise created by this type of gear rattling upon its shaft. Thus far, most of these efforts have included devices disposed exteriorly of the gear shaft and have most frequently been mounted upon the gear member thereby making the gear a complicated and thus expensive part to manufacture. Also, most anti-rattle gearing devices of this general type have been concerned, heretofore, with preventing the overrunning and underrunning phenomenon between gear and shaft thus appreciating only one of the several causes of gear noise which the present invention endeavors to remedy.

Thus, it is generally an object of the invention to provide a novel mechanism for eliminating gear noise in a sliding gear transmission.

In particular it is an object of the invention to provide a device disposed within a gear shaft and coacting with the gear to prevent the rattling of a gear thereon.

It is also the purpose of the invention to provide a novel mechanism for preventing the backlash of a gear slidably splined upon a shaft.

It is a further object of the invention to provide an anti-rattle gear mechanism which tends to bias a gear simultaneously in two normally disposed planes.

Additionally it is an object of the invention to provide a spring-detent mechanism for taking up pitch circle and radial clearances between coacting gear and shaft splines and to thereby eliminate periodic contact therebetween.

Further objects and details will be apparent from a perusal of the specification and claims appended thereto.

In the drawings:

Figure 1 is a cutaway sectional view of a sliding gear assembled upon a shaft and disclosing that portion of the invention which inhibits rattling caused by radial clearance between gear and shaft splines.

Figure 2 is a sectional view through the anti-rattle mechanism disclosing the anti-backlash aspect of the invention.

Figure 3 is an enlarged detail of a portion of Figure 1 showing the inclination of an opening through the shaft with respect to the centerline of the gear.

The invention is best illustrated by a shaft 11 having splined portion 12 integral with or mounted upon the shaft for rotation therewith. Slidably retained upon the splined portion of shaft 11 is an internally splined gear 13. A shifting collar 14 is formed on gear 13 to enable the latter to be moved longitudinally upon shaft between a power transmitting and non-power transmitting or floating position. In the power transmitting position gear 13 is adapted to mesh with another gear member of the transmission the remainder of which for the sake of simplicity has not been shown.

In Figure 1 the gear is shown in the non-power transmitting or floating position upon the shaft, and in which condition the gear is merely turning with the shaft and is out of engagement with any other gears.

To retain the gear member 13 upon the shaft 11 for rotation therewith while permitting longitudinal shifting therealong, as noted above, it is conventional practice to form spline members 16 externally of the shaft and splines 17 internally of the gear. To facilitate the sliding movement of the gear upon the shaft, it is necessary to provide a radial clearance such as at 18 in the nature of .003 of an inch. Likewise, the thickness of the respective spline members is designed to provide what may be referred to as pitch circle clearance 19 of approximately the same magnitude as the radial clearance. The total pitch circle clearance between any two coacting splines is substantially what is known as backlash.

By virtue of radial clearance 18, gear 13, under the influence of the various irregular inertia forces at play during vehicle movement, can experience a limited rocking motion relative to shaft 11 in either direction about a point 21, Figure 1, in a plane normal to the plane of rotation of the gear. That is to say that the plane of rotation of the gear can be inclined in either direction from its normal vertical position in an amount determined by the radial clearance.

Similarly, the pitch circle clearance 19, Figure 2, between the spline members enables gear 13 to limitedly rock relative to shaft 11 about point 21 in a plane normal to the shaft axis. The occurrence of latter movement is normally denominated as torsional backlash. These uncontrolled and undesirable rocking motions of gear 13 relative to shaft 11 about point 21 are interrupted by gear splines 17 striking some portion of the adjacent splines 16 on shaft 11 and which intermittent contact is the source of the objectionable gear noise which is presently sought to be eliminated.

In order to prevent the noise occasioned by the repeated striking together of the gear and shaft splines 17 and 16, this invention provides a mechanism which simultaneously tends to cause bi-planar inclination of the gear relative to the shaft, thereby unidirectionally eliminating the clearances noted above and also resiliently maintaining coacting spline members in engagement.

The anti-rattle mechanism constituting the invention will now be particularly described.

A hole or passage 22 is formed transversely of shaft 11. The axes of hole 22 and shaft 11 intersect at point 21. The hole, as will be seen in Figures 1 and 3, is inclined in a clockwise direction to the plane of gear 13. It is to be understood that the direction of hole inclination is not critical in the invention and may be varied, as desired, with the predominant hand of rotation of the shaft.

Conical recesses 23 and 24 are formed internally of gear 13 approximately adjacent the opposite ends of the hole 22. The apices of the conical recesses, as viewed from Figure 1, are in a plane through point 21 normal to the axis of shaft 11.

Disposed within hole 22 and urged radially outwardly therefrom by a spring 26 are a pair of spherical detent elements 27 and 28. Inasmuch as the centerline of hole 22 is inclined to the plane of rotation of gear 13, as the detents 27 and 28 are urged outwardly by spring 26, they contact the right and left wall portions respectively of recesses 23 and 24, as viewed from Figure 1, tending to rock the gear in a clockwise direction about point 21 until portions of gear splines 17 resiliently engage coacting portions of shaft splines 16. In this way any propensity for periodic movement of gear 13 about point 21 in a plane normal to the plane of rotation of the gear is resiliently damped out.

The identical elements employed to dampen any periodic oscillation of gear 13 in the plane normal to the plane of rotation of the gear are also utilized to substantially eliminate torsional backlash between the splines of gear 13 and shaft 11. However, while recesses 23—24 and hole 22 have a given axial relationship in the plane normal to gear 13 through point 21, that relationship is inverted in the plane of rotation of gear 13. As viewed from Figure 2, the axis of hole 22 passes diametrically through point 21, and the axis of the recesses is now inclined in a clockwise direction from the hole axis. It is now apparent, Figure 2, that as the detents extend radially into engagement with the recesses they also contact the left and right walls respectively of the recesses 23 and 24, thus urging the gear in a counterclockwise direction so as to make unidirectional contact between portions of gear and shaft splines 17 and 16. By thus retaining the coacting splines, any tendency toward torsional backlash is resiliently damped out.

While it is true that the inclination of passage 22, relative to recesses 23—24, Figure 1, tends to cause the longitudinal inclination of gear 13 in a plane normal to the plane of rotation of the gear and that the inclination of the axis of recesses 23—24 relative to passage 22, Figure 2, tends to cause gear 13 to incline in the plane of rotation of the gear relative to shaft 11, it is apparent that in actuality the gear will be resultantly inclined relative to shaft 11 somewhere between these normally disposed planes.

In shifting gear 13 to its power transmitting position to the right in Figure 1, detents 27 and 28 are moved radially inwardly by the conical recesses 23 and 24 against the force of spring 26 and the anti-rattle mechanism is thus rendered inoperative. To preclude the possibility of detents falling out of the hole 22 upon the longitudinal shifting of the gear, a flange 29 is made sufficiently wide to at least partially overlie the hole openings when the gear is so moved and thereby retaining the inoperative detents within passage 22.

While this invention provides an anti-rattle mechanism for correcting multi-planar rattling of a gear upon its shaft, it is to be recognized that a simpler version of the mechanism may be utilized for eliminating relative movement between a gear and a shaft in a single plane. As an illustration, it is possible to use such a sliding gear arrangement in a substantially stationary installation in which case the only rattling of any consequence would be that produced by torsional backlash between the gear and its shaft. Consequently, the anti-rattle mechanism could be more simply made to embody only the anti-backlash feature of Figure 2.

While it has been necessary for the sake of illustration and simplicity to disclose a particular form of the invention, it is to be understood that minor structural variations may be made within the scope of the invention.

We claim:

1. In a power transmission mechanism including in combination a shaft, splines on said shaft, a gear splined for axial movement upon said shaft, the splines of said gear and said shaft being dimensioned to provide clearances therebetween, and anti-rattle means for simultaneously urging relative bi-planar rotation between said gear and said shaft to take up the clearances between coacting gear and shaft splines.

2. In a power transmission mechanism including a shaft having splines externally thereof, a gear having splines internally thereof, said gear and shaft splines coacting to slidably retain said gear upon said shaft for rotation therewith, said splines being dimensioned to provide radial and pitch circle clearances between said gear and shaft splines and means for simultaneously taking up each of said clearances.

3. In mechanism of the type described, a shaft, a hollowed-out member slidably mounted upon said shaft, said shaft and said member having mating formations compelling rotation of one with the other, said formations being dimensioned to provide clearances therebetween, said shaft being provided with a transverse guideway, a detent member movable in said guideway, resilient means for forcing said detent member toward said hollowed-out member, said hollowed-out member being provided with an internal recess adjacent the end of said guideway, said guideway and said recess having axes so angularly disposed one relative to the other that said detent member is resiliently forced into such contact with the wall of said recess as to cause movements of said hollowed-out member relative to said shaft in directions to take up said clearances.

4. In mechanism of the type described, a shaft, a gear slidably mounted upon said shaft, said shaft and said gear having spline formations compelling rotation of one with the other, said formations being dimensioned to provide radial and pitch circle clearances therebetween, said shaft being transversely bored to provide guideways, detent members movable in said guideways, resilient means for forcing said detent members toward said gear, said gear being provided with internal recesses adjacent the ends of said guideways, said guideways and said recesses having axes so angularly disposed one relative to the other that said detent members are resiliently forced into contact with the walls of said recesses to cause movements of said gear relative to said shaft in directions to take up said clearances.

5. In mechanism of the type described, a shaft, a gear slidably mounted upon said shaft, said shaft and said gear having mating spline formations compelling rotation of one with the other, said formations being dimensioned to provide radial and pitch circle clearances therebetween, said shaft being provided with a transverse guideway, detent members movable in said guideway, resilient means for forcing said detent members toward said gear, said gear being provided with internal opposite coaxial recesses adjacent the ends of said guideway, said guideway having its axis inclined relative to the plane of rotation of said gear, said recesses having their axis inclined in the plane of rotation of said gear relative to the axis of said guideway whereby said detent members are resiliently forced into contact with the wall of said recess to cause movements of said hollowed-out member relative to said shaft in directions to take up said clearances.

6. In mechanism of the type described, a shaft, a gear slidably mounted upon said shaft, said shaft and said gear having mating spline formations compelling rotation of one with the other, said formations being dimensioned to provide radial and pitch circle clearances therebetween, said shaft being provided with a transverse guideway, ball detent members movable in said guideway, resilient means for forcing said detent members toward said gear, said gear being provided with internal opposite coaxial conical recesses adjacent the end of said guideway, said guideway and said recesses having their axes so angularly disposed one relative to the other that said detent members are resiliently forced into contact with the walls of said recesses to cause movement of said gear in one direction to take up said radial clearance and in another direction to take up said pitch circle clearance.

7. In mechanism of the type described, a shaft, a gear slidably mounted upon said shaft, said shaft and said gear having mating spline formations compelling rotation of one with the other, said formations being dimensioned to provide radial and pitch circle clearances therebetween, said shaft being provided with a transverse guideway, ball detent members movable in said guideway, resilient means for forcing said detent members toward said gear, said gear being provided with internal opposite coaxial conical recesses adjacent the ends of said guideway, said detent members being forced into said recesses to resiliently engage the walls thereof, said guideway having its axis inclined relative to the plane of rotation of said gear whereby said engagement of detent members and recess walls moves said gear in one direction to take up said radial clearance, said recesses having their axis inclined relative to the axis of said guideway in the plane of rotation of said gear whereby said engagement moves said gear in another direction to take up said pitch circle clearance.

References Cited in the file of this patent

UNITED STATES PATENTS

| Number | Name | Date |
|---|---|---|
| 1,813,209 | Spase | July 7, 1931 |
| 2,615,315 | Werner | Oct. 28, 1952 |

FOREIGN PATENTS

| Number | Country | Date |
|---|---|---|
| 15,816 | Great Britain | Nov. 9, 1915 |
| 380,999 | Great Britain | Sept. 29, 1932 |
| 406,934 | Germany | Dec. 4, 1924 |